United States Patent [19]
Dimitrova et al.

[11] Patent Number: 5,870,754
[45] Date of Patent: Feb. 9, 1999

[54] VIDEO RETRIEVAL OF MPEG COMPRESSED SEQUENCES USING DC AND MOTION SIGNATURES

[75] Inventors: Nevenka Dimitrova; Mohamed S. Abdel-Mottaleb, both of Ossining, N.Y.

[73] Assignee: Philips Electronics North America Corporation, New York, N.Y.

[21] Appl. No.: 637,844

[22] Filed: Apr. 25, 1996

[51] Int. Cl.$^6$ .................................................. G06F 17/30
[52] U.S. Cl. ................................. 707/104; 707/3; 707/1
[58] Field of Search .................... 707/104, 5, 1, 707/6, 3, 4

[56] References Cited

U.S. PATENT DOCUMENTS

| | | | |
|---|---|---|---|
| 5,019,899 | 5/1991 | Boles et al. ................................ | 358/84 |
| 5,347,308 | 9/1994 | Wai ......................................... | 348/394 |
| 5,410,343 | 4/1995 | Coddington et al. ..................... | 348/7 |
| 5,465,353 | 11/1995 | Hull et al. ................................ | 707/5 |
| 5,504,518 | 4/1996 | Ellis et al. ............................... | 348/2 |
| 5,546,578 | 8/1996 | Takada ..................................... | 707/5 |
| 5,623,308 | 4/1997 | Civanlar et al. ......................... | 348/392 |
| 5,659,365 | 8/1997 | Wilkinson ................................ | 348/416 |
| 5,708,767 | 1/1998 | Yeo et al. ................................ | 345/440 |

OTHER PUBLICATIONS

"The JPEG Still Picture Compression Standard", by Gregory K. Wallace, Communication of the ACM, Apr. 1991, vol. 34, No. 4, pp. 31–45.
"Comparison Between Papers from the Literature Survey and DC+M Method", by N. Dimitrova & M. Abdel-Mottaleb.
"Query by Image and Video Content The QBIC System", by Myron Flickner ET AL, IBM Almaden Research Center, Sep. 1995, pp. 23–32.
"Video Browsing using Clustering and Scene Transitions on Compressed Sequences*", by Minerva M. Yeung ET AL, SPIE vol. 2417, pp. 399–413.
"Retrieving (JPEG) Pictures in Portable Hypermedia Documents", By Dick C.A. Hulterman, pp. 217–226.
"Image Retrival using Image Context Vectors: First Results", by Stephen I. Gallant, Belmont Research Inc., SPIE vol. 2420.
"A Video Browsing using Fast Scene Cut Detection for an Efficient Networked Video Database Access", IEICE Trans. Inf. & Syst., vol. E77–D, No. 12, Dec. 1994, pp. 1355–1364.
"Flexible Montage Retrieval for Image Data", by Hiroaki Sakamoto ET AL, SPIE vol. 2185, pp. 25–33.
The International Society for Optical Engineering Conference Title: Proc. SPIE–Int. Soc. Opt. Eng. (USA), vol. 3022, p. 59–70, 1997, Dimitrova N. et al: "Content–based video retrival by example video clip".
*Practical Digital Video With Programming Examples In C*, by Phillip E. Mattison, John Wiley and Sons, Chapter 11, pp. 373 through 392.
In MPEG: A Video Compression Standard for Multi–Media Applications, by Didier Le Gall, Communications of the ACM, Apr. 1991, vol. 34, No. 4, pp. 47 through 58 and pp. 31 through 44.
Boon–Lock et al.,"Rapid Scene Analysis on Compressed Video", IEEE Transactions on Circuits & Syatems for Video Tech., vol. 5 Iss. 6, pp. 533–544, Dec. 12 1995.
Wei et al., "A Scene Change detection algorithm for MPEG compressed Video Sequences", IEEE 1995 Candian Conference on Electrical & Computer EG, vol. 2, pp. 827–830, Sep. 1995.

*Primary Examiner*—Wayne Amsbury
*Assistant Examiner*—Greta L. Robinson
*Attorney, Agent, or Firm*—Bernard Franzblau

[57] ABSTRACT

Signatures from MPEG or Motion JPEG encoded video clips are extracted based on the luminance, chrominance, and motion vector values. The signatures are stored in a database, along with corresponding location, size, and time length information. The signature of a query video clip, also encoded in the MPEG or Motion JPEG format, is extracted. The signature of the query video clip is compared with the signatures stored in the meta database, with video clips having signatures similar to the signature of the query video clip identified. The video clips are then retrieved and displayed by selection of a user.

21 Claims, 11 Drawing Sheets

VIDEO RETRIEVAL OF MPEG COMPRESSED SEQUENCES USING DC AND MOTION SIGNATURES

1. BACKGROUND OF THE INVENTION

A. Field of the Invention

The present invention relates to storing and retrieving from large digital video archives video images encoded using the Moving Picture Experts Group (hereinafter referred to as MPEG) encoding standard or the Motion JPEG (Joint Photographic Experts Group), and specifically to the extraction, based on DC coefficients and motion vectors, of video sequence signatures from MPEG or Motion JPEG compressed videos, and the search for and retrieval of videos based on the extracted signatures.

B. Description of the Related Art

The MPEG video compression standard is described in *Practical Digital Video With Programming Examples In C*, by Phillip E. Mattison, John Wiley and Sons, 1994, chapter 11, pages 373 through 393, and in "MPEG: A Video Compression Standard for Multi-Media Applications", by Didier Le Gall, *Communications of the ACM*, April 1991, vol. 34, no. 4, pps. 47 through 58, and the JPEG video compression standard is described in "The JPEG Still Picture Compression Standard", by Gregory K. Wallace, *Communications of the ACM*, April 1991, vol. 34, no. 4, pps. 31 through 44, all of which are incorporated by reference herein.

Also applicable to video images digitally encoded using the Motion JPEG standard, the present invention is set forth herein with reference to video images digitally encoded using the MPEG encoding standard.

MPEG is an encoding standard used for digitally encoding of, typically with a computer, motion pictures for use in the information processing industry. With the MPEG encoding standard, video images can be stored on CD-ROMs, magnetic storage such as hard drives, diskettes, tape, and in random access memory (RAM) and read-only memory (ROM). Further, the MPEG encoding standard allows video images to be transmitted through computer networks such as ISDNs, wide area networks, local area networks, the INTERNET™, the INTRANET™, and other communications channels as explained below.

Video clips (which are also referred to as video streams) are sequences of an arbitrary number of video frames or images. An example of a video clip is images from is a television news show or other sources. MPEG video clips encoded as MPEG-video or using the MPEG system-layer encoding are eligible to have signatures extracted, in accordance with the present invention.

The MPEG encoding standard applies to video compression of images and the temporal aspects of motion video, taking into account extensive frame-to-frame redundancy present in video sequences.

In the MPEG encoding standard, the color representation is YCrCb, a color scheme in which luminance and chrominance are separated. Y is a luminance component of color, and CrCb are two components of chrominance of color. For each four pixels of luminance, one pixel of Cr and one pixel of Cb is present. In the MPEG encoding standard, the chrominance information is subsampled at one-half the luminance rate in both the horizontal and vertical directions, giving one value of Cr and one value of Cb for each 2×2 block of luminance pixels. Chrominance and luminance pixels are organized into 8×8 pixel blocks (or blocks). Pixel blocks are transformed into the frequency domain using the discrete cosine transform (DCT) operation, resulting in DC and AC components corresponding to the pixel blocks.

In the MPEG encoding standard, images in a sequence are represented by four types: I frame, P frame, B frame, or D frame. Further, in the MPEG encoding standard, each image is divided into slices, with a slice comprising one or more macro blocks. Slices are typically contiguous macro blocks.

A macro block comprises four 8×8 blocks of luminance pixels and one each 8×8 block of two chrominance (chroma) components. Therefore, a macro block comprises the DCT coefficients for four 8×8 blocks of luminance pixels and one 8×8 block for each of two chrominance coefficient pixels. Alternatively, the macro block may be encoded using forward or backward motion vectors, for B or P frames only. A forward motion vector of a frame is based on motion relative to a previous frame, while a backward motion vector of a frame is based on motion relative to a subsequent frame.

Within an image video clip, through the MPEG encoding standard, the value of a DC coefficient is encoded relative to the previous DC coefficient, with DC values for luminance being encoded relative to other luminance values and DC values for chrominance being encoded relative to chrominance values.

With the MPEG encoding standard, which comprises MPEG-video, MPEG-audio, and MPEG system-layer encoding (which incorporates MPEG-video, MPEG-audio, and information regarding how the two interact), motion video can be manipulated as data transmitted between computers, and manipulated within a computer.

Building large video archives which allow video clips to be stored, retrieved, manipulated, and transmitted efficiently requires the incorporation of various technologies. Examples of such technologies are video analysis, content recognition, video annotation, and browsing. From the user's point of view, the most important capability is efficient retrieval based on the content of video clips. The existing methods for content-based retrieval rely principally on the extraction of key frames or on text annotations.

Video browsing systems which rely on text retrieve video sequences based on key word annotation. The textual annotations which are normally stored separately can be indexed using full text retrieval methods or natural language processing methods.

Browsing systems which use key frames as a representative model for video sequences rely on the idea of detecting shot boundaries and choosing one or more frames as key frames. A shot is a contiguous number of video frames that convey part of a story. Most modern movies contain over a thousand cuts (a cut is a point in a video sequence in which there is a scene change, and is a change between shots), requiring an intelligent video retrieval program to process frames on the order of thousand frames per movie to give a coherent representation. For the user to see what is in the video, the user must preview the key frames in the above-mentioned browsing systems.

Further, the above-mentioned browsing systems use individual key frames and motion to search for video clips, without accounting for the sequence of key frames to represent the video clips when submitting the whole video clip as a query.

An alternative retrieval method for the browsing systems is by displaying particular frames of the video sequence to the user, allowing the user to review and select the particular video sequence. However, this alternative method is time consuming for the user.

2. SUMMARY OF THE INVENTION

Therefore, an object of the present invention is to retrieve video sequences without relying on text annotations.

A further object of the present invention is to retrieve video sequences using signatures of representative frames, taking into account motion between frames.

Another object of the present invention is to extract signatures from video clips digitally-encoded, using the MPEG encoding standard, based on DC components of the DCT coefficients and motion vectors (the signatures extracted by the present invention being referred to as DC+M signatures).

A further object of the present invention is to retrieve video clips quickly and efficiently from a large database of video footage.

Another object of the present invention is to retrieve from local or remote databases video clips similar to a query video clip using signatures of the database video clips and the query video clip.

Still another object of the present invention is an approach for archiving video clips of Motion JPEG compressed videos and MPEG compressed videos.

An additional object of the present invention is to re-encode video clips previously encoded using encoding standards other than Motion JPEG or MPEG into one of the Motion JPEG or MPEG format, and extract and store signatures therefrom.

Another object of the present invention is a retrieval method that takes a video clip as a query and searches a database for clips with similar content, facilitating retrieval of clips from lengthy video footage for the purpose of editing, broadcast news retrieval, and copyright violation determination.

In the present invention, video clips encoded using Motion JPEG are considered as MPEG video streams in which all frames are intracoded frames (no P frames or B frames are included, with all frames being I frames). In video clips encoded using the MPEG encoding standard, DC components and motion vectors are determined conventionally. In the case of Motion JPEG, a query clip is a sequence of JPEG frames. In video clips encoded using Motion JPEG, in the present invention, the above-mentioned signatures use only the DC color information (the DC component of the DCT coefficients), without using motion information. The DC color information is determined conventionally.

Further in the present invention, a signature of a video clip (herein after referred to as a video clip signature) is represented by the sequence of signatures extracted from representative MPEG frames (herein after referred to as frame signatures) within that video clip. Frame signatures comprise DC components and motion vector components corresponding to pairs of windows within each frame. Therefore, the signatures extracted in the present invention are referred to as the DC+M signatures. In the DC+M signature extraction method of the present invention, each video clip is represented by a sequence of frame signatures, which requires a comparatively smaller amount of storage space than do the encoded video objects (or clips). The DC+M method for extracting signatures, in the present invention, is very fast, because the DC coefficients and the motion vectors from MPEG frames can be extracted without fully decoding the MPEG frames. The signatures can be extracted, in the present invention, in real time, while the video clips are being encoded into the MPEG format or while the MPEG-encoded video clips are being at least partially decoded (as explained below).

After signatures of the video clips have been extracted by the present invention, the video retrieval method of the present invention compares a signature of a video clip (herein after referred to as a query video clip) against a database storing signatures of video clips (herein after referred to as database video clips). In accordance with the present invention, two video clips are compared as sequences of signatures extracted by the present invention. The above-mentioned comparison is performed for each video clip in the video clip database, and a record (or score) is kept of the degree of matching (or similarity) between the signature of the query video clip and the signature of each database video clip. The similarity between two video clips is based upon the Hamming distance measure between the signatures of the two video clips, and is explained in detail below.

The user can then select which, or all, of the video clips to be viewed according to the score. The order of signatures within the sequence is based on the order of frames in the video clip. The sequential order of signatures is used as a basis to represent the temporal nature of video in the present invention.

These together with other objects and advantages which will be subsequently apparent, reside in the details of the construction and operation as more fully herein after described and claimed, reference being had to the accompanying drawings forming a part hereof, wherein like numerals referred to like parts throughout.

3. BRIEF DESCRIPTION OF THE DRAWINGS

Further details of the present invention are explained below, with the aid the attached drawings, in which.

Figure 8B:
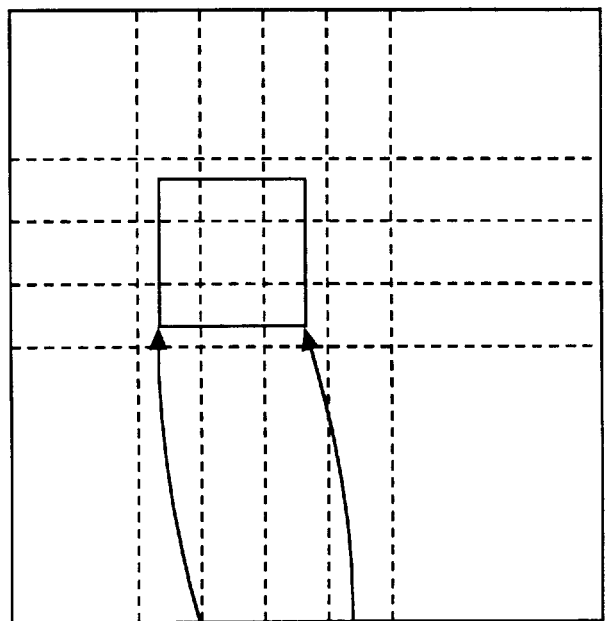
Figure 8A:
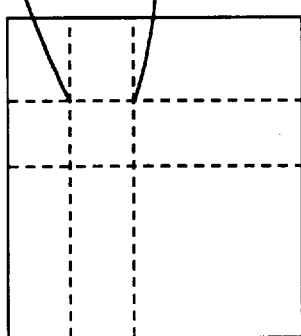
Figure 9:
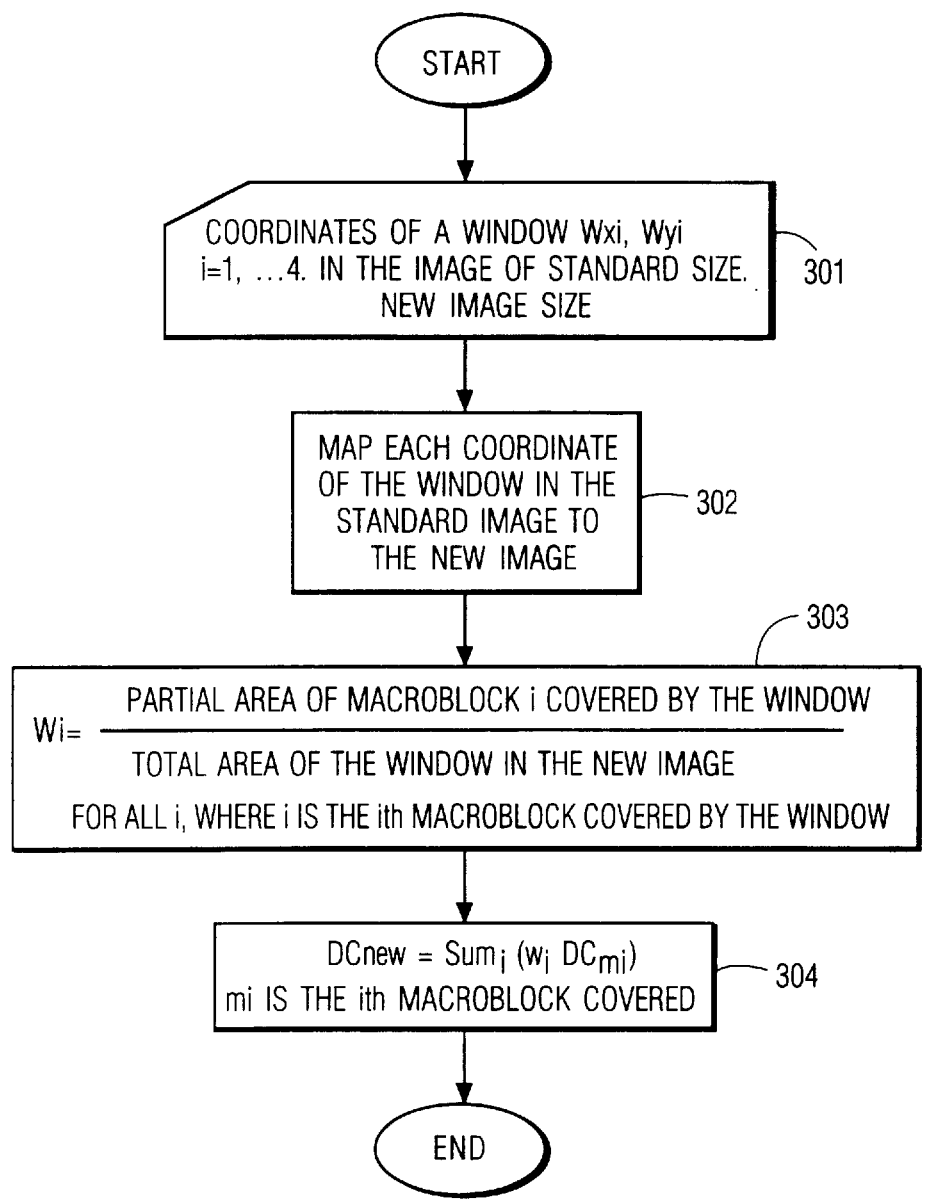
Figure 10:
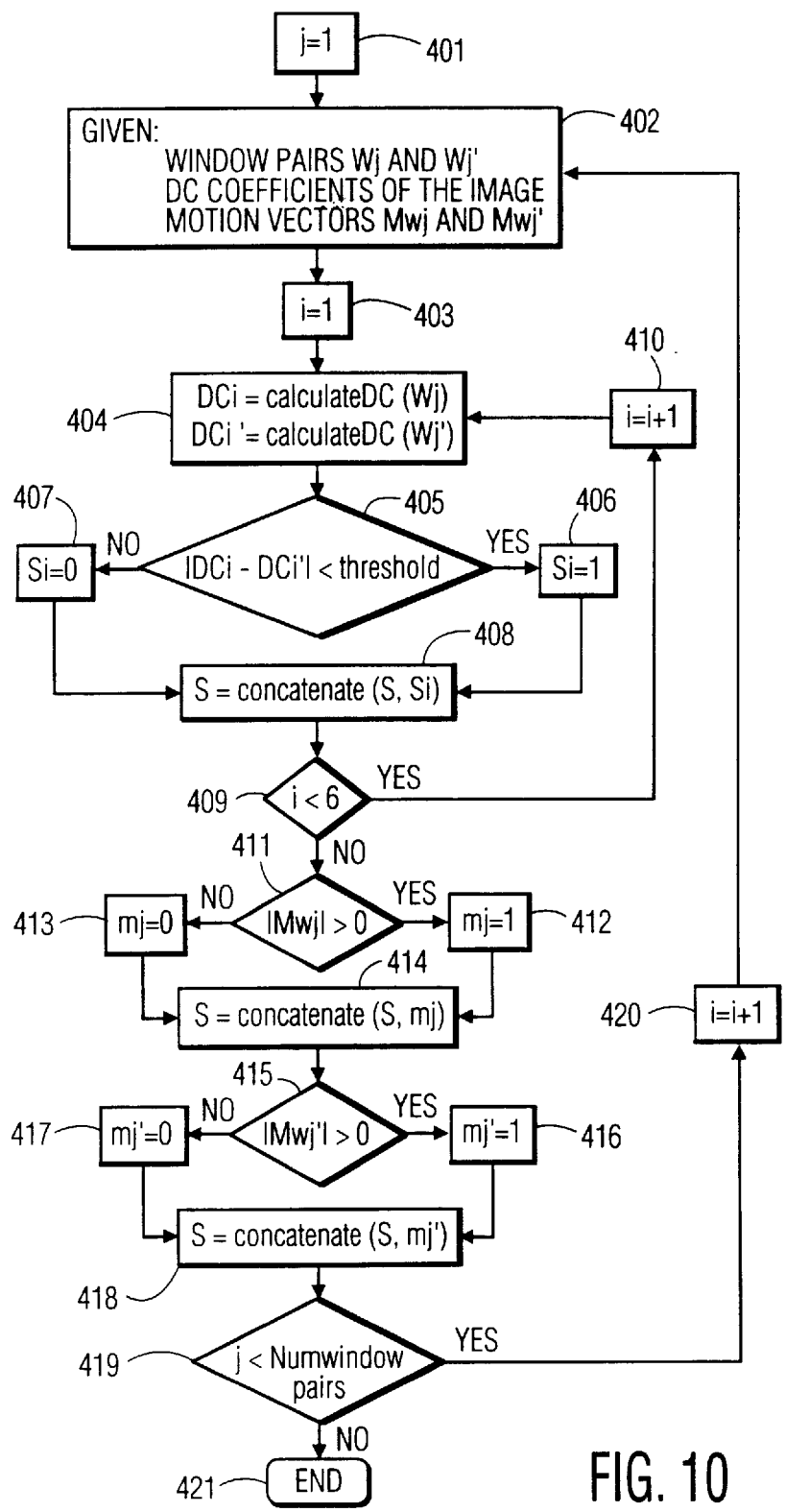
Figure 11A:
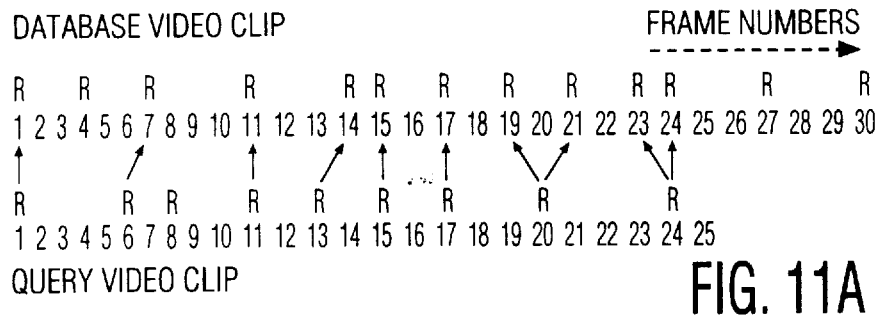
Figure 11B:
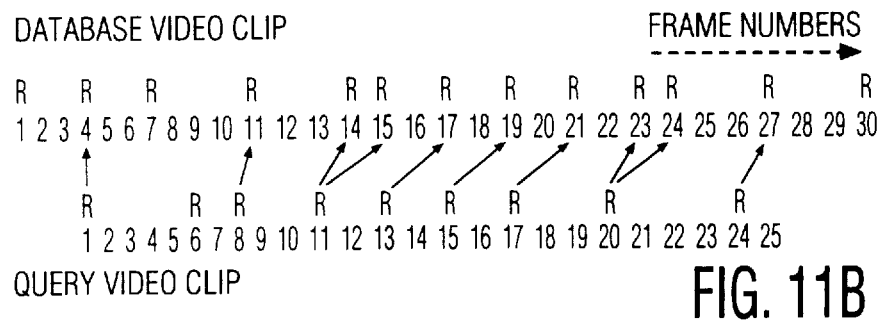
Figure 11C:
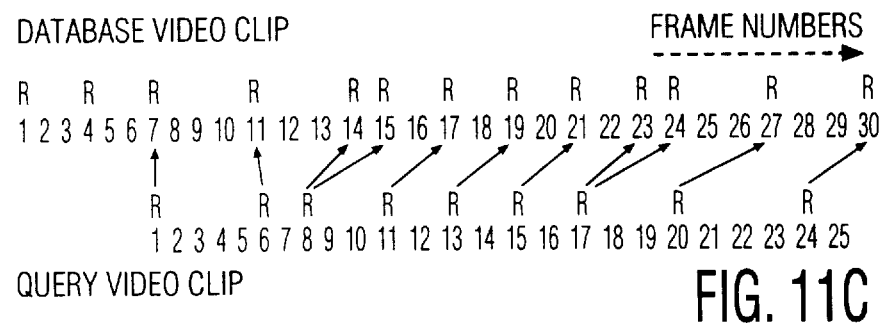
Figure 11D:
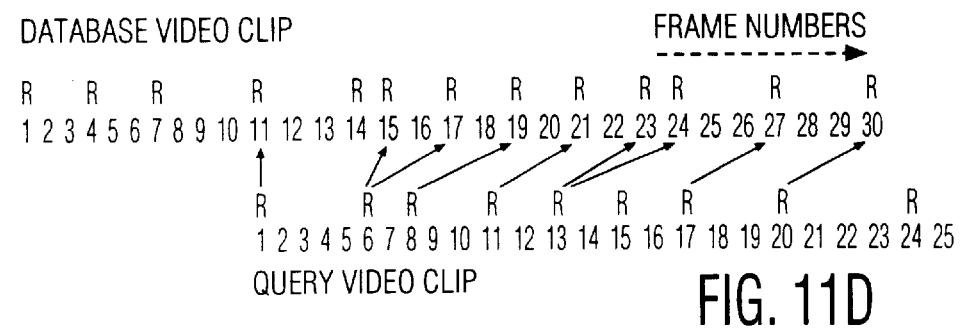
Figure 12:
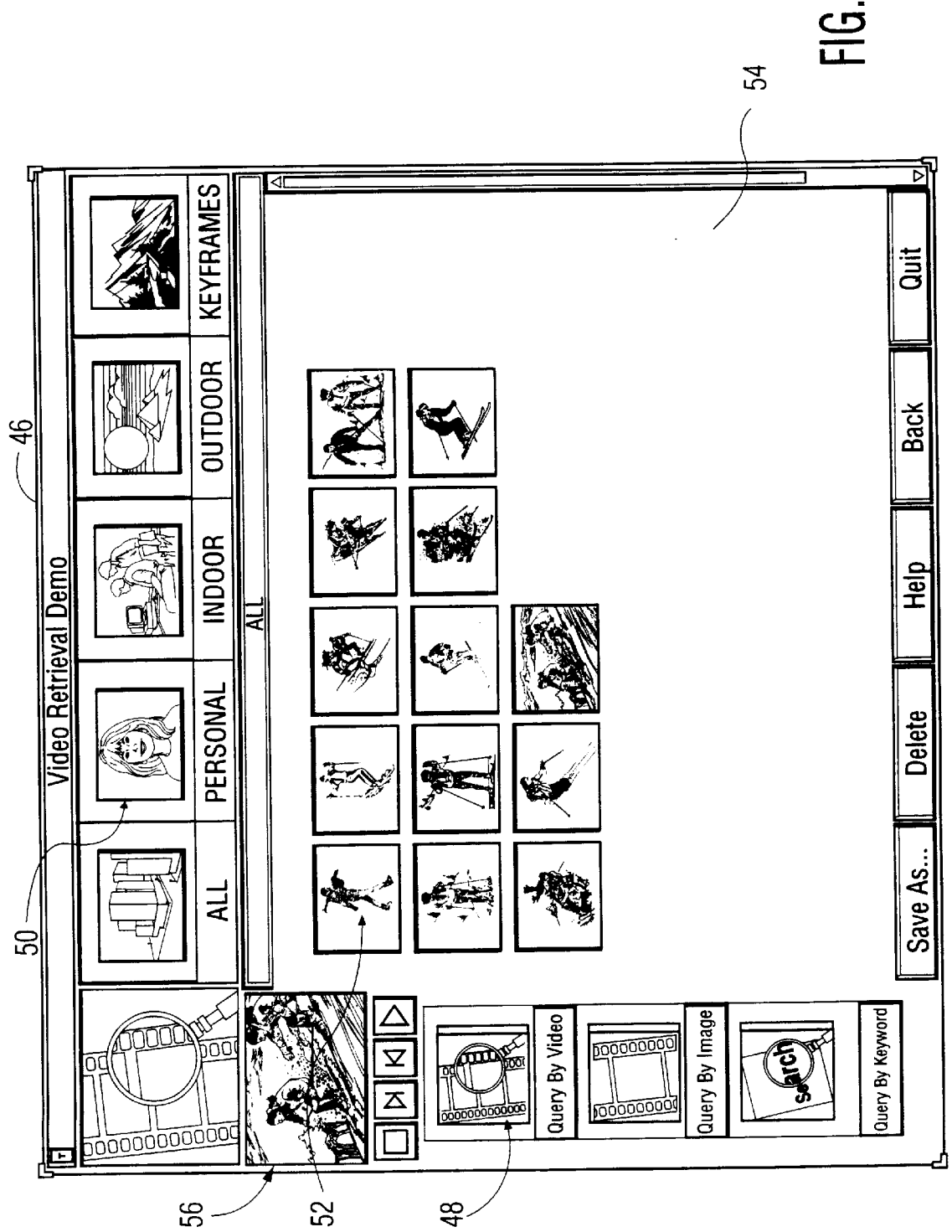

FIGS. 8(A) and 8(B) are detailed diagrams of mapping windows in images of different sizes, in the present invention;

FIG. 9 is a flowchart for mapping windows and calculating DC coefficients of the present invention;

FIG. 10 is a flowchart showing the signature extraction and the archival process of the present invention;

FIGS. 11(A), 11(B), 11(C), and 11(D) show examples of a comparison between frames in a database video clip and frames in a query video clip in the retrieval process of the present invention; and FIG. 12 is a display showing a demonstration of query video clips and database video clips retrieved by the present invention and displayed on a user interface.

4. DESCRIPTION OF THE PREFERRED EMBODIMENTS

There are two main aspects of the present invention, explained below:

(1) archival and signature extraction, and (2) retrieval of video clips using signatures.

Archival and signature extraction refers to extracting signatures of video clips and storing the extracted signatures of the video sequences in a database. Retrieval refers to extracting the signature from a query video clip (which video clip is one designated by the user for which other, similar video clips are to be identified), then comparing that query video clip signature against the signatures representing the video clips, which signatures are stored in the database.

A video clip from which a signature is to be extracted by the present invention must be at least partially encoded using the MPEG (or Motion JPEG) encoding standard. A video clip at least partially encoded for signature extraction in the present invention must be encoded (using the MPEG or the Motion JPEG standard) at least to the level of having DC coefficients and motion vectors (if the video clip is MPEG-encoded), without quantization, run-length encoding and Huffman coding. In addition, and also for signature extraction in accordance with the present invention, a video clip must be at least partially decoded, meaning that the video clip must be Huffman decoded, run-length decoded, and dequantized, and have DCT coefficients and motion vectors (if the video clip is MPEG-encoded). Motion vectors are present only in video clips at least partially encoded or decoded using the MPEG encoding standard. For video clips at least partially encoded or decoded using the Motion JPEG encoding standard, motion vectors are not present.

Figure 1:
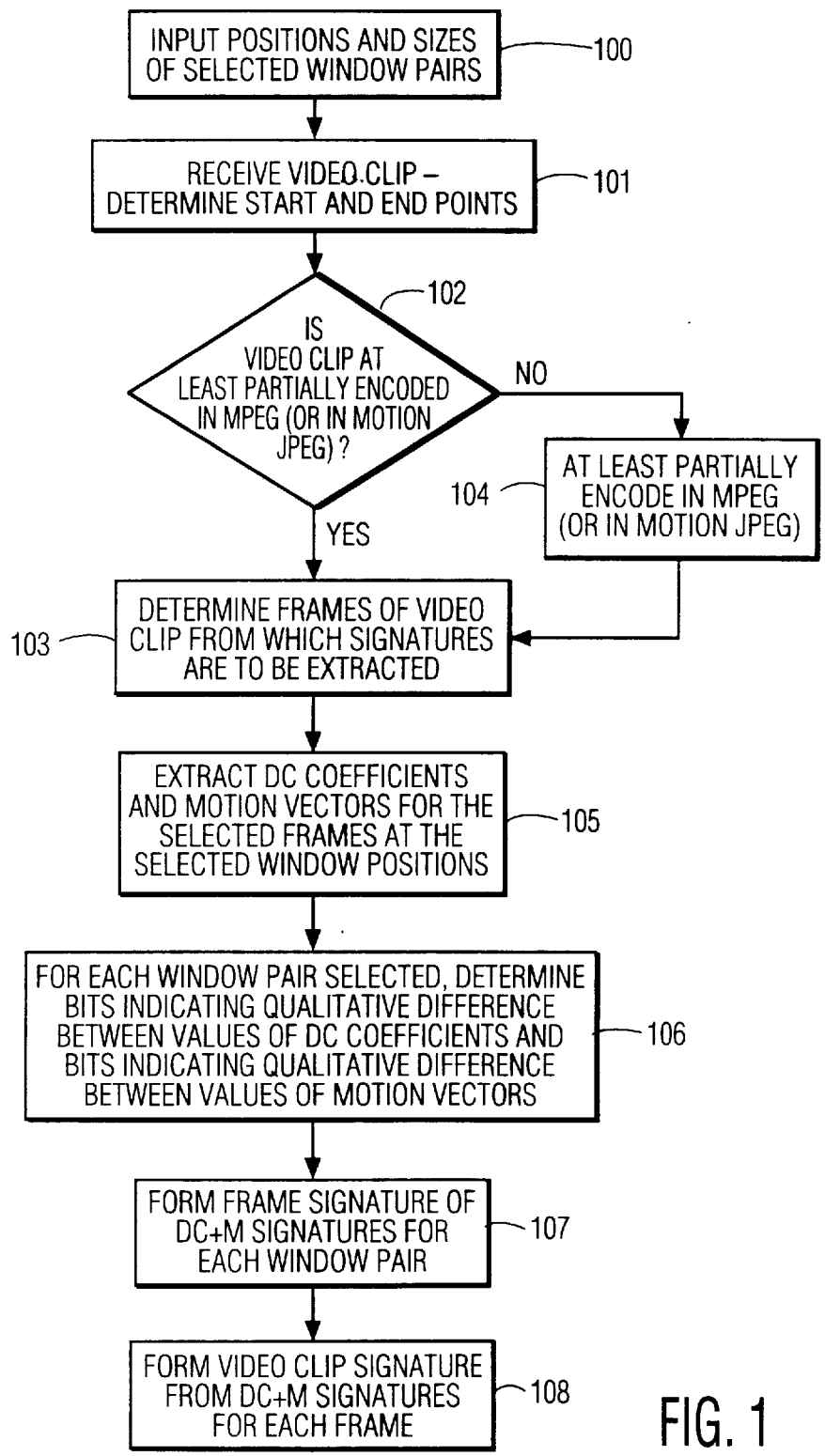
FIG. 1 is an overview of the signature extraction method of the present invention.

FIG. 1 shows a flowchart of an overview of extracting signatures of representative frames from a video clip. Referring now to FIG. 1, positions and sizes of selected window pairs, which are constant for all of the video clip signature sequences stored in a database, are input in step 100. The exact placement of the window pairs within each frame is predetermined, and is fixed for each frame within the video clip from which the signature is being extracted.

As shown in step 101, a video clip is received by the present invention, and the start and end points of the video clip are determined. Then, in step 102, whether the video clip is at least partially encoded using the MPEG or the Motion JPEG encoding standard, is not encoded at all, or is encoded using a different encoding standard, is determined. If the video clip is not encoded at all or is encoded using a non-MPEG encoding standard, the video clip is at least partially encoded using the MPEG encoding standard in step 104.

As explained in detail below, frames from which signatures are to be extracted are determined in step 103. A signature is not necessarily extracted from each frame of the video clip.

As shown in step 105, once the frames from which a signature is to be extracted are determined, DC coefficients and motion vectors for the selected frames at the selected window positions are extracted.

In step 106, bits corresponding to the qualitative difference between values of the DC coefficients and bits indicating the qualitative difference between values of the motion vectors (DC+M signatures) between each window in the window pair are determined. In step 107, the signature of the frame (i.e., the frame signature) is formed by concatenating each of the foregoing DC+M signatures for each window pair within the frame. Then, in step 108, the signature of the video clip (the video clip signature) is represented by the sequence of the signatures of the representative frames.

Once a signature corresponding to a video clip is extracted, that signature is typically stored in a database containing signatures of other video clips. More than one signature may be extracted to represent a particular video clip, depending upon the placement of the windows within the frames. Therefore, there may be multiple signature databases, each storing signatures having windows placed in the same arrangement and locations as other signatures within that database.

In the present invention, after the signature of a query video clip is extracted, a database storing signatures obtained in the manner prescribed herein is searched to locate video clips similar to the query video clip, based on the signature thereof. The searching method can be adjusted locate and retrieve video clips with varying degrees of similarity to the query video clip.

Figure 2:
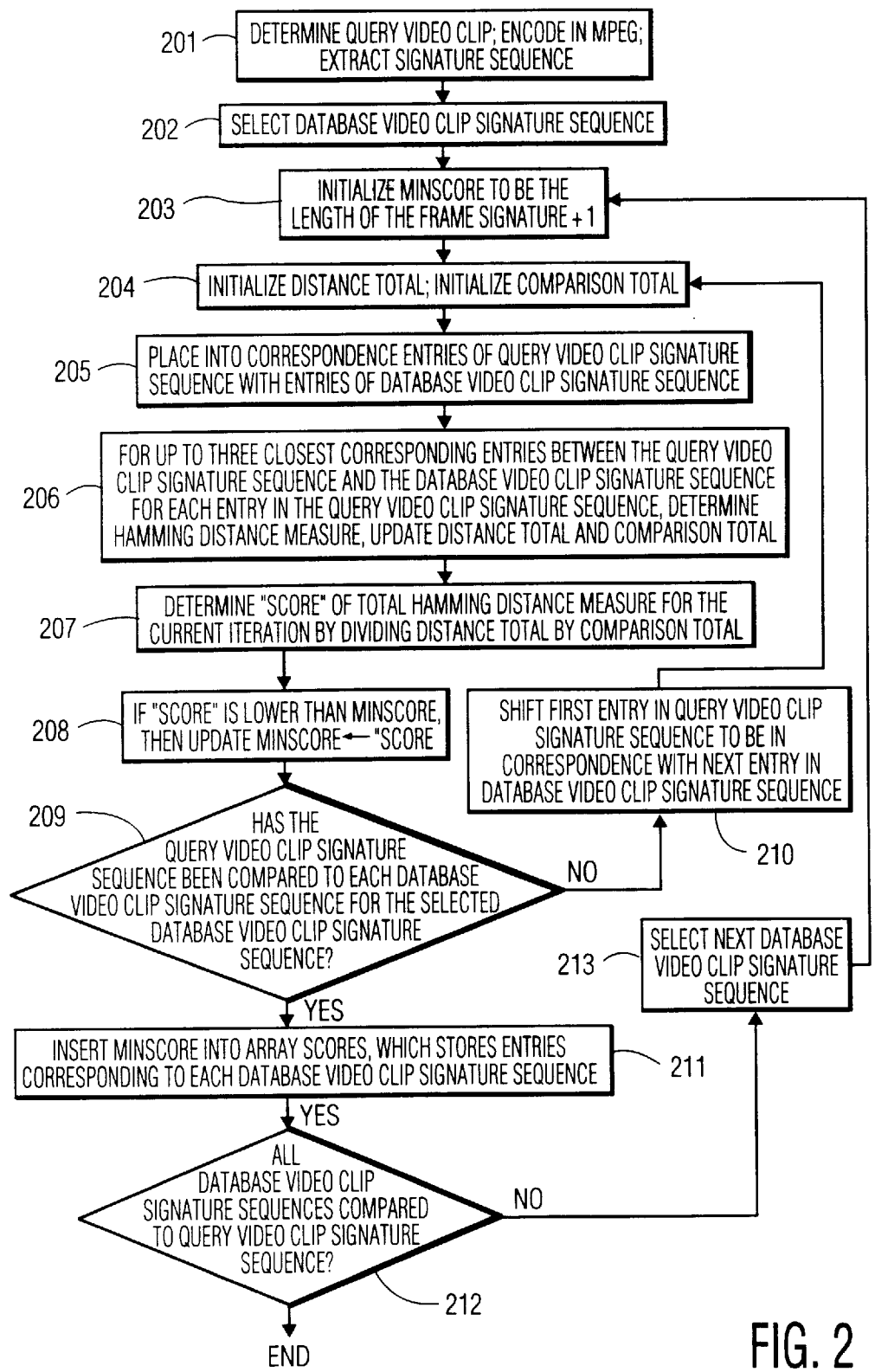
FIG. 2 is an overview of the signature comparison method of the present invention.

FIG. 2 shows an overview of determining matches between a signature of a query video clip and signatures of other video clips, which signatures are stored in at least one local database.

As shown in FIG. 2, in step 201, the query video clip is first determined, and is at least partially encoded using the MPEG encoding standard. The signature of the query video clip is extracted by the process of the present invention presented with reference to FIG. 1 and discussed in detail below. Signatures from the video clips being searched are typically stored in local databases, in a preferred embodiment of the present invention.

In step 202, a signature corresponding to a database video clip is selected for comparison to the signature of the query video clip. All signatures stored in a local signature database are searched for similarity to the signature of the query video clip and using the process of the present invention. Therefore, any representative frame signature stored in the local database may be the first signature selected for comparison.

In step 203, the variable minscore is initialized to the length of the frame signature+1. The length of the frame signature in a preferred embodiment of the present invention is 128; therefore, the value of minscore is initialized to the value of 129, which value is larger than the largest possible value for the Hamming distance measure between the signature sequence extracted from the query video clip and the signature sequence extracted from the database video clip. As shown in step 208, below, minscore stores the value of the lowest total Hamming distance measure between the query video clip signature sequence and the database video clip signature sequence calculated for a given database video clip signature sequence.

In step 204, a variable is initialized, which variable stores a total of the Hamming distance measure between representative frame signatures from the query video clip and representative frame signatures from the video clip being compared to the query video clip. Also initialized in step 204 is a variable counting the number of comparisons made between a frame signature of the query video clip and frame signatures of the database video clip.

In step 205, entries from the query video clip signature (which entries are the frame signatures of the representative frames extracted as explained herein) are placed into correspondence with (as explained below) entries from the database video signature. The entries are the frame signatures of the representative frames extracted as explained herein. Further, the sequence of entries from each video clip signature are collectively referred to as signature sequences for the video clip.

The first entry from the query video clip signature is placed into correspondence with the first entry from the database video clip signature. Further entries from each of the query video clip signature and the database video clip signature are placed into correspondence with each other, as explained in detail below. In addition, and also as explained in detail below, the location of the frame signature within the video clip signature sequence is not necessarily the same as the location of the frame, from which the frame signature was extracted, within the video clip.

As shown in step 206, a comparison is performed between an arbitrary frame signature in the query video clip signature sequence and up to three frame signatures in the database video clip signature sequence corresponding to the arbitrary frame signature from the query video clip signature sequence. In a preferred embodiment of the present invention, a distance of one frame (which number is arbitrarily selected, but which could be any number), taking into account any offset or shifting between the entries in the query video clip signature sequence and the database video clip signature sequence, in either the forward or the backward direction in the video clip is permitted for comparison between frame signatures extracted therefrom. If a distance greater than one frame in either the forward or backward direction is selected, then a query video clip frame signature may be compared with more than three frame signatures from the database video clip.

In step 207, the Hamming distance measure from the signature of the query video clip to the signature of each corresponding frame in the database video clip is determined for the current iteration of steps 204 through 210. The distance variable is updated accordingly, as is the variable tracking the number of comparisons made. One "score" of the total Hamming distance measure between frames compared for each shift is recorded.

Then, in step 208, if the value of "score" is lower than the value of minscore, the value of "score" is stored in minscore.

The database video clip signature typically will contain more entries than the query video clip signature. If more entries exist in the database video clip signature sequence than in the query video clip signature sequence, then the signature sequence from the query video clip is compared against each series of entries from the database video clip, preserving the sequence of frames for each video clip. The foregoing is accomplished by first placing in correspondence with each other the first entry in each signature sequence and carrying out the comparison explained below. Then, the entire sequence of frame signatures in the query video clip is shifted by one entry, and the comparison sequence is repeated. The shifting occurs repeatedly until the sequence of frame signatures from the query video clip signature sequence is compared to the corresponding sequences of entries in the database video clip signature.

In step 209, whether the query video signature sequence has been compared to each database video signature sequence for the selected database video clip signature is determined. If not, in step 210, the query video signature sequence is shifted by one entry with respect to the database video signature sequence (as explained in detail herein with reference to FIGS. 11(A) through 11(D)) and control is returned to step 204 for the next iteration.

In step 209, if the query video signature sequence has been compared to each database video signature sequence for the selected database video clip signature, then step 211 is executed.

In step 211, the value stored in minscore is inserted into array Score, which stores entries of minscore corresponding to each database clip.

Whether all database video clips signature sequences stored in the database have been compared to the query video clip signature sequence is determined in step 212.

If all database video clips signature sequences have not been compared to the query video clip signature sequence, then in step 213 the next database video clip sequence is selected, and steps 203 through 212 are repeated for the foregoing next database video clip signature sequence selected.

If all database video clips signature sequences have been compared to the query video clip signature sequence, the process shown in FIG. 2 is complete.

The similarity between the query video clip signature and the database video clip signature is determined as the number of bits in the signature (which is 128 in a preferred embodiment of the present invention) minus the Hamming distance measure between the foregoing video clip signatures. If the Hamming distance between two video clip signatures is small, then the similarity between the two video clip signatures is high. Therefore, if database video clip signatures are ordered based on the respective similarity to the query video clip signature, then the database video clip signatures are placed into descending order of similarity. A higher degree of similarity between two video clips indicates that the two video clips are closer in appearance.

On the other hand, if database video clip signatures are ordered based on the respective Hamming distance from the query video clip signature, then the database video clip signatures are placed into ascending order of Hamming distance. A lower degree of Hamming distance between two video clips indicates that the two video clips are closer in appearance.

The particulars of the signature extraction method and the signature search and retrieval method of the present invention are explained below. Although the present invention is explained below with reference to the MPEG encoding standard, the present invention is also applicable to video clips encoded using the Motion JPEG encoding standard.

Figure 3:
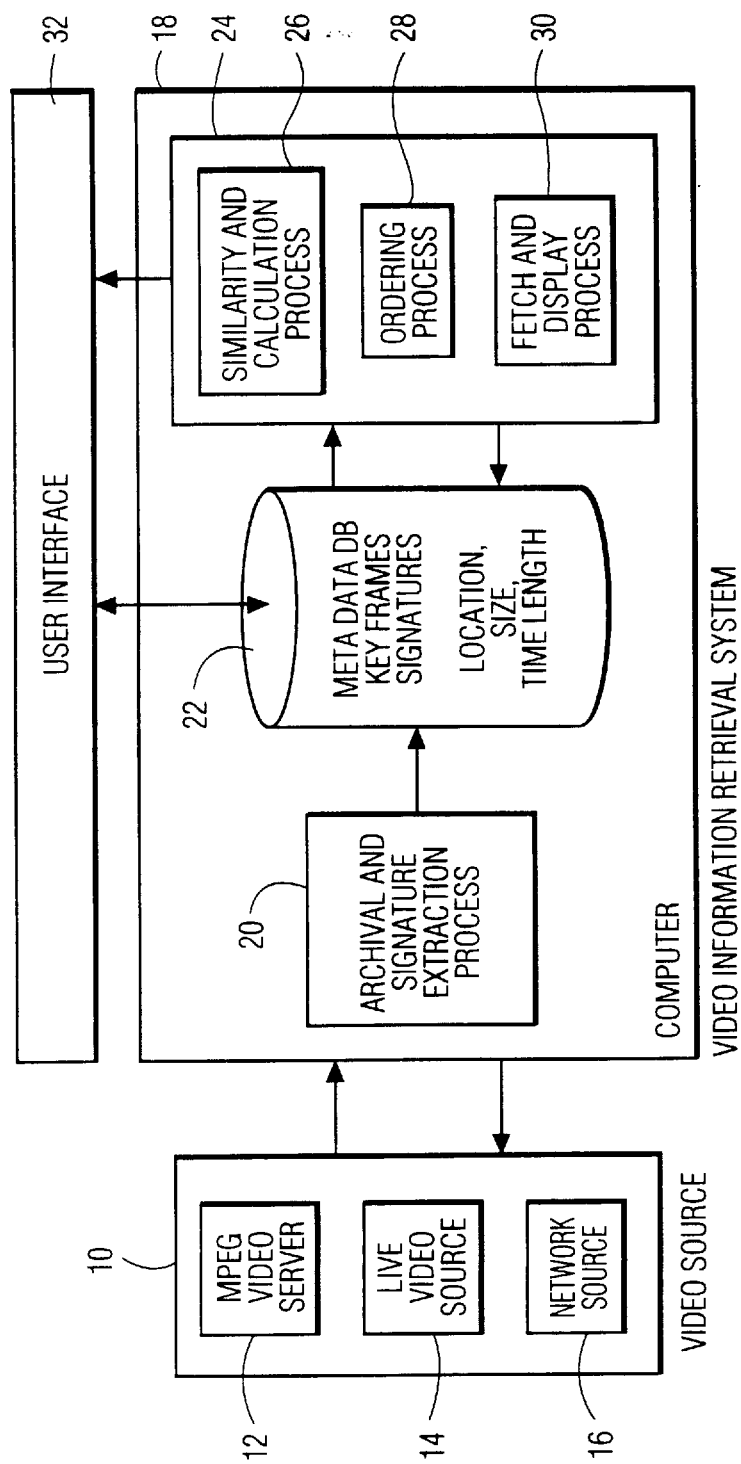
FIG. 3 is a block diagram of the system architecture for video retrieval of the present invention.

In a preferred embodiment of the present invention, video signature extraction and storage system 8 shown in FIG. 3 is implemented on a computer, such as a SUN™ workstation or a Pentium™-based personal computer. Video signature extraction and storage system 8 includes video source 10, video information retrieval system 18, and user interface 32 also shown in FIG. 3.

In the video signature extraction and storage system 8 of the present invention shown in FIG. 3, video source 10 receives video clips from a variety of sources. The video clips could be already digitally encoded in the MPEG (or Motion JPEG) format and provided by MPEG video server 12. Further, the video clips may be provided from live video, which is provided by live video source 14, or encoded in the MPEG (or Motion JPEG) format or in a format other than MPEG (or Motion JPEG), which are provided by network source 16.

Each of MPEG video server 12, live video source 14, and network source 16 may interface to other, respective sources providing video clips thereto and which are not shown in FIG. 3. A representative source to which MPEG video server 12 interfaces is the INTERNET™, which may store video clips at ftp sites on computers running the UNIX™ operating system along with an ftp daemon or at a variety of Web sites running http servers awaiting html document requests.

Video source 10 provides to a video information retrieval system 18 video clips from each of the foregoing sources. If video clips are provided to video information retrieval system 18 from MPEG video server 12, no further encoding is necessary before extraction of the signature sequences.

On the other hand, if live video source 14 provides video clips to video information retrieval system 18, the video clips must be compressed using the MPEG encoding standard before the signature sequences are extracted. For example, a video camera or a television may interface to live video source 14.

Likewise, if video clips are provided by the network source 16 to the video information retrieval system 18, the video clips may have been encoded in a format other than the MPEG format; subsequently, the video clips must be partially re-encoded using the MPEG encoding standard by, for example, a video bridge, before extraction of the signature sequences may occur.

In the present invention, video clips requiring encoding into the MPEG format are encoded in a conventional way, using conventional computer hardware and software.

After the MPEG-encoded video clips are received by the video information retrieval system 18, archival and signature extraction process 20 extracts the signature of each video clip.

In addition, the archival and signature extraction process 20 stores the extracted DC+M signatures of video clips received from the MPEG video server 12 in meta database 22. Meta database 22 is referred to as a "meta" database because data that describe other data (i.e., signatures of video clips and other descriptive data thereof) are stored therein. Archival and signature extraction process 20, in a preferred embodiment, is implemented in software on any UNIX™-based computer, personal computer, or other platform. Archival and signature extraction process 20 could also be part of an MPEG encoder or MPEG decoder hardware implementation board.

On the other hand, if archival and signature extraction process 20 receives live video from live video source 14, archival and signature extraction process 20 compresses or partially compresses in a conventional way the live video using the MPEG encoding standard, extracts the DC+M signature from the compressed MPEG video clips, and stores the extracted signatures in meta database 22. Similarly, if the network source 16 transmits video clips to archival and signature extraction process 20, then archival and signature extraction process 20 re-encodes the video clips into the MPEG format, extracts the DC+M signatures from the re-encoded MPEG video clips, and stores the signatures in the meta database 22.

Along with the extracted signatures of video clips (which signatures comprise frame signatures), archival and signature extraction process 20 stores in meta database 22 other identifying information such as the location at which the corresponding video clip is stored, the size of the video clip in bytes, the time length of the video clip, and the title of the video clip. The frames for which frame signatures are extracted are also referred to as representative frames.

Referring again to FIG. 3, retrieval subsystem 24 uses the signature extracted from a query video clip by the present invention to search meta database 22 for signatures of video clips similar thereto. Retrieval subsystem 24 includes: a similarity calculation process 26, an ordering process 28, and a fetch and display process 30.

The similarity calculation process 26 determines the "similarity" between a signature of a query video clip and signatures of the video clips stored in meta database 22. The determination of "similarity" between video clips is explained in detail below. The ordering process 28 determines the ordering of video clips whose signatures are stored in meta database 22. The ordering process 28 uses the "similarity" measure from the retrieval method of the present invention to determine how the video clips are ordered.

The fetch and display process 30 contains pointers for displaying video clips whose signatures are stored in meta database 22. The video clips may be stored locally or remotely, such as at a remote web site on the INTERNET™ and archived using the archival and signature extraction process 20. In the foregoing example, if the video clip is stored at a remote Web site on the INTERNET™ fetch and display process 30 tracks the INTERNET™ node of the video clip, and location on the remote file system.

In a preferred embodiment of the present invention, each of the similarity calculation process 26, the ordering process 28 and the fetch and display process 30 is a software program, but could also be implemented in hardware or firmware.

User interface 32, in the present invention, is front end software being executed by a computer, in a preferred embodiment, and written using development kits, such as VISUAL C++™ or VISUAL BASIC™ in which a user can submit a video clip and display search results. An example of a user interface 32 of the present invention is shown FIG. 12, and explained with reference thereto.

Extraction of the signature sequences in accordance with the present invention is now explained.

Each frame signature, in a preferred embodiment of the present invention, is represented by 128 bits for signatures extracted from video clips which are MPEG-encoded. (For signatures extracted from video clips which are Motion JPEG-encoded, each frame signature is represented by 96 bits, as explained below.) However, the number of bits may be varied by a user, depending upon a resolution or sensitivity desired in the signature of the video clip. In addition, the signature may include 128 bits for every frame of the video clip, for every other frame of the video clip, etc.

A video clip can be considered to be a sequence of video frames, i.e., $\{i_o, \ldots, i_n\}$. A video clip can also be represented by a subset of those frames $\{j_o, \ldots, j_n\}$. The representative frames, which are frames for which a signature is extracted in the present invention, can be selected based on the MPEG frame pattern or using the key frames extracted from scene transitions. Each frame is represented using a signature based on the DC coefficients of window pairs and their motion vectors.

In the present invention, the video clips can be indexed in the following ways:

1. Using I frames as a basis for deriving the DC+M signatures. This method does not require the extraction of key frames. However, the index generated is larger and the retrieval time is longer; or
2. Using the key frames as a basis: In the case of video footage with long scenes, this method generates fewer frames with which to work.

In the present invention, the DC+M signatures are of two types: local DC+M signatures and global DC+M signatures. Local DC+M signatures are also referred to as frame signatures and are signatures derived from a particular frame and neighboring frames, without consideration of the larger context of frames to which the particular frame belongs.

For both the local DC+M signatures and the global DC+M signatures of the present invention, the DC components of the frame signatures are extracted in the same way. However, the motion bits of the signature differ between the local DC+M signatures and the global DC+M signatures. The motion bits, in the present invention, represent whether the motion vector associated with a frame is zero or non-zero. For a local DC+M signature of a representative frame, the motion bits indicate whether the motion vector is zero or non-zero with respect to motion between the representative frame and frames immediately surrounding the representative frame. However, for global DC+M signature of a representative frame, the motion bits indicate whether the motion vector is zero or non-zero with respect to motion between the representative frame and frames a number of frames away from the representative frame. The motion signature is typically represented by two bits per window pair in local DC+M signatures of the present invention.

Also in the present invention, key frame positions can be used as representative frames for which signatures are extracted, in accordance with the present invention. Generating signatures depends on the position of the key frame:

1. If a key frame is an I frame: the DC coefficient is taken from the I frame and from the corresponding motion vectors from the following B or P frame—no extra processing is required;
2. If the key frame is a B frame: the reference frames are considered to obtain the DCT coefficients. The DC coefficients are extracted from respective macro blocks in the previous I or P frame or in a future I or P frame. The motion vectors in the current frame are used to derive the motion vector signature; and
3. If the key frame is a P frame: signature extraction processing is moved one frame ahead. Most of the luminance and chrominance blocks in the frame ahead will be intracoded (i.e., all information about the macro block in which the blocks are included is contained therein and described by DCT coefficients only, without using motion vectors), simplifying the extraction of the DC coefficients. To extract the DC coefficients, the present invention uses the DC coefficients from the respective macro block of the previous reference frame (which is an I frame or P frame). To obtain motion bits of the frame signature, the motion vectors from the next B frame are used. If the next frame is an I frame, then the motion vectors from the closest future B or P frame are used for the motion signature. Therefore, if the key frame is a P frame, the frame signature is extracted from DC coefficients and motion vectors associated with the above-mentioned frames.

If the positions of the key frames are not known in advance, then the signature extraction method of the present invention will use the I frames in the video clip.

Global DC+M signatures are also referred to as frame signatures and are extracted from a frame with respect to a sequence of frames within a video shot or within a frame pattern encoded by the MPEG standard. For global DC+M signatures, the DC component of the signature is extracted in the same manner as in the case of the local DC+M signatures, described in detail below. The motion part of the signature is determined by tracking the macro blocks corresponding to the window pairs until the next I frame is reached or over a subset of the number of frames in the video clip. Then, a qualitative description, also explained below, for the relative motion of the window pairs is calculated. In this case, the motion signature can be longer than two bits per window pair. The motion signature reflects the relationship between the windows in the window pair over the subset of the number of frames in the video clip.

Figure 4:
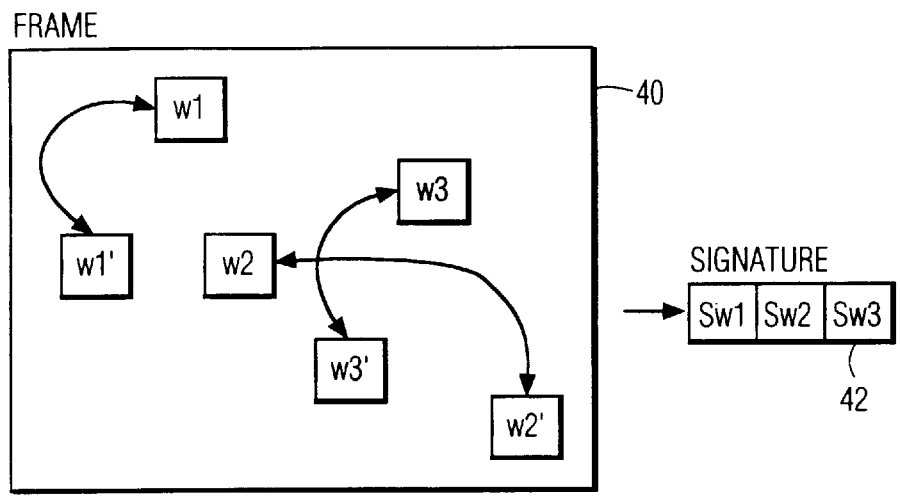
FIG. 4 is a diagram of signature extraction from window pairs in a video frame, of the present invention.

The signatures in the present invention are derived from relationships between window pairs, as shown in FIG. 4. For each image frame 40, a number of window pairs is selected, in which every window pair corresponds to one part of the signature. Therefore, the number of window pairs determines the length of the signature. Each window of a window pair corresponds to one macro block or region which covers multiple macro blocks in the picture frame.

Figure 5:
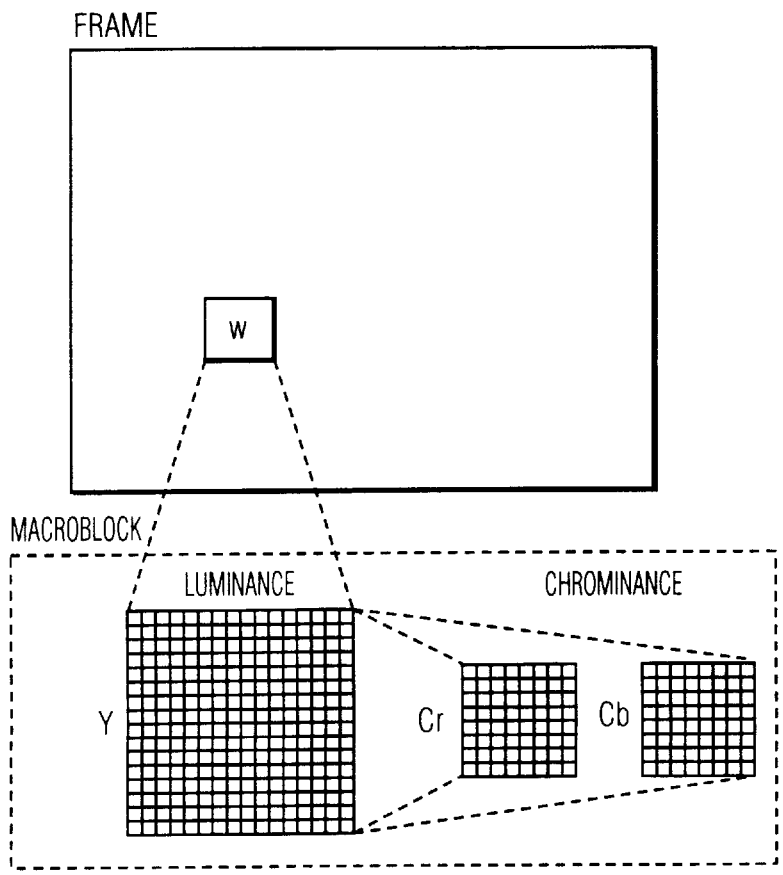
FIG. 5 is a diagram showing a macro block structure.

A macro block in an MPEG frame corresponds to a 16×16 pixel area, as shown in FIG. 5. As previously discussed, the chrominance and luminance samples are organized into 8×8 pixel blocks. A macro block includes four 8×8 blocks of luminance pixels and one 8×8 block of each of the two chrominance (or chroma) components, as shown in FIG. 5. In a preferred embodiment of the present invention, the signatures of window pairs are derived in the following manner:

(a) for a video sequence containing only I frames (such as for video sequences encoded using Motion JPEG): 96 bits are derived from each I frame, in which 64 bits are derived from the luminance plane, and two sets of 16 bits are derived from each of the two chrominance planes, for a total of 96 bits for the DC components. There is no contribution to the signatures from motion vectors (for subsequent video clip signature sequence matching, explained below, using signatures extracted from only the Motion JPEG encoded video clips, only the foregoing 96 bits are used);

(b) for a video sequence containing I, B, and P frames (such as for video sequences encoded using MPEG): a 128 bit signature (which is also referred to as a key) is derived in which 96 bits are derived from the DC coefficients and 32 bits are derived from the motion information available in the MPEG data stream, also for a total of 128 bits (for subsequent video clip signature sequence matching, explained below, using signatures extracted from I, B, and P frames, all of the foregoing 128 bits are used).

Figure 6:
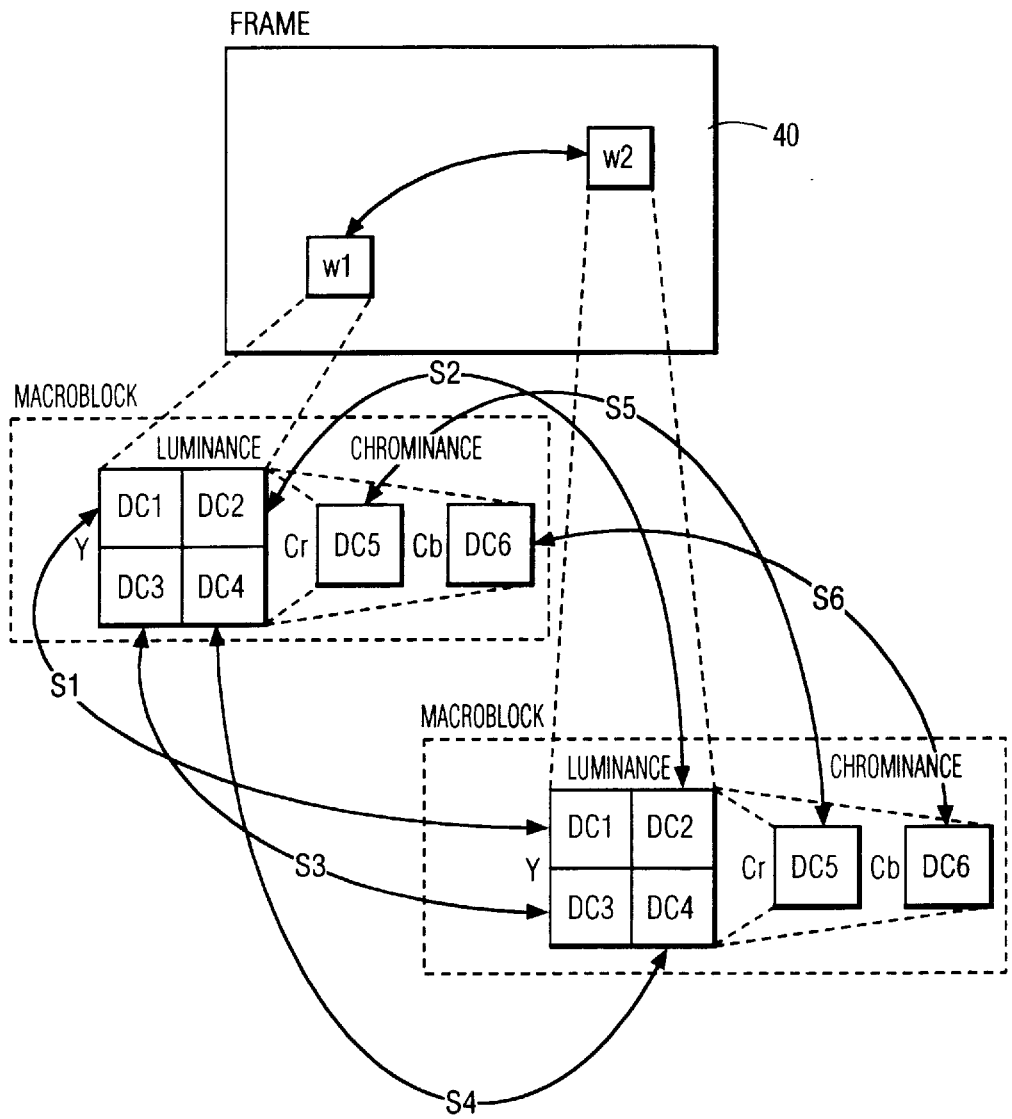
FIG. 6 is a diagram explaining derivation of bits in a signature of the present invention.

As shown in FIG. 6, frame 40 includes three examples of window pairs: w1 and w1', w2 and w2', and w3 and w3'. The positions of window pairs are selected in advance, but are fixed for the entire meta database 22 of signatures and for a signature of a query video clip. A single video clip, accordingly, may have multiple signatures stored in multiple meta databases 22. For example, if one set of signatures, stored in one meta database 22, concentrating on the middle of frames is desired, matching windows are chosen accordingly. On the other hand, if signatures stored in another meta database 22 are meant to correspond to background areas, window positions are chosen accordingly. In the present invention, there are sixteen window pairs for each frame.

From each set of window pairs w1 and w1', w2 and w2', and w3 and w3' in frame 40 shown in FIG. 4, a signature 42 is extracted. In the example shown in FIG. 4, signature 42 includes window signature Sw1 from the signature corresponding to window pair w1 and w1'; window signature Sw2 from the signature corresponding to window pair w2 and w2'; and window signature Sw3 from the signature corresponding to window pair w3 and w3'.

The following is an example of how window signatures for each of the foregoing window pairs are determined in accordance with the present invention. For each window, or macro block, shown in FIG. 6, DC coefficients for the luminance blocks and for each of the two chrominance blocks shown in FIG. 5 are extracted. As shown in FIG. 5, four blocks in the luminance plane and two blocks in the chrominance planes are used for signature extraction. The foregoing determination of the DC components of the luminance blocks and chrominance blocks is performed in a conventional manner.

Using the window pair w1 and w1' as an example, as shown in FIG. 6, each window in the window pair has six DC coefficients (DCi). As shown in FIG. 6, in a preferred embodiment of the present invention, six signature bits S1 through S6 are extracted for each window pair based upon the following:

$Si=1$ if $|DCi-DCi'| <= \text{threshold}$ (1)

$Si=0$ if $|DCi-DCi'| > \text{threshold}$ (2)

The result of the extraction for each window pair shown in FIG. 6 of the six associated DC components is the signature 42 shown in FIG. 4. Signature 42 contains, in the above-mentioned example, 6 bits for each of signatures Sw1, Sw2, Sw3, corresponding to window pairs w1 and w1', w2 and w2', and w3 and w3'. In addition, if the video clip for which the signature is being extracted is encoded using the MPEG standard, motion bits (not shown in FIG. 4 but discussed herein below) also contribute to the signature 42.

In a preferred embodiment, a bit in signature $S_i$ is calculated using the above-mentioned pair of DC coefficients based upon the above-mentioned equations (1) and (2). However, the signature could also be calculated using other functions of the DCT coefficients of the MPEG-encoded video clip. For example, the signature could be calculated by adding a DC component to an AC component, then dividing by an arbitrary number.

In the present invention, in a preferred embodiment, there are 16 window pairs for each frame. Having 16 window pairs is preferred because computers most efficiently store binary numbers in groups of $2^n$, and unsigned integers are typically stored in 32 bits using many software compilers (for example, many compilers of C™ language computer software). In addition, there are 6 blocks in a macro block, as described herein above, and 16 bits per block, from which the DC components are derived: 4 luminance blocks×16 bits=64 bits, and 1 block for each of 2 chrominance (Cr and Cb) blocks giving 2×16 bits=32 bits for chrominance.

In a preferred embodiment, motion between windows in a window pair is described in a qualitative manner as follows, using 2 motion bits:

1. Bits are set to 00 if both windows exhibit zero motion (i.e., if the motion vector is zero);
2. Bits are set to 01 if the first window is static (the motion vector is zero) but the second window has moved (the motion vector is non-zero);
3. Bits are set to 10 if the first window has moved (the motion vector is non-zero) but the second window was static (the motion vector is zero); and
4. Bits are set to 11 if both windows exhibit motion (both motion vectors are non-zero).

There is no contribution to the signature from motion bits if the video clip is encoded using the Motion JPEG format.

Figure 7:
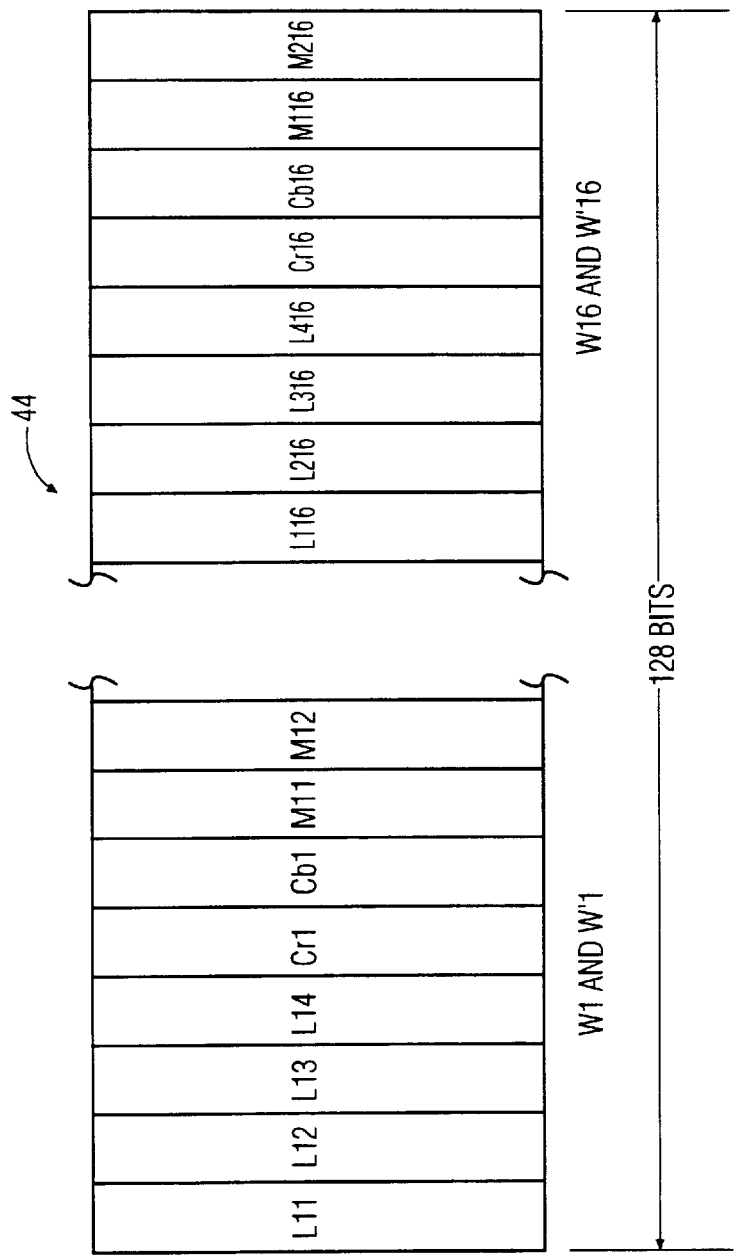
FIG. 7 is a diagram showing organization of signature bits in the present invention.

FIG. 7 shows an example of a signature, for window pairs of a frame, extracted by the present invention. The signature 44 shown in FIG. 7 is 128 bits in length, organized into groups of 8 bits per 16 window pairs. For example, of the first 8 bits in the signature shown in FIG. 7, bits L11 through L14 are the above-mentioned luminance bits for window pair w1 and w1'; bits Cr1 and Cb1 are the chrominance bits for window pair w1 and w1'; and bits M11 and M12 are the motion bits (if present) for window pair w1 and w1'. Eight bits for each of window pairs w2 and w2' through w16 and w16' are organized accordingly in FIG. 7.

As shown in FIGS. 8(A) and 8(B), window size and positions are relative to image sizes. In some case a window will cover only one macro block, as shown in FIG. 8(A). In other cases, the window will cover more than one macro block and possibly parts of many macro blocks, as shown in FIG.(B). If the window covers more than one macro block and parts of many macro blocks, as in FIG. 8(B), the DC value is calculated as the weighted sum of the DC values of the macro blocks which are covered by the window. In that case, the weights are the relative areas of the macro blocks covered by the window.

To normalize window size, as above, if a window covers more than one macro block, the window is mapped to a window of standard size in accordance with the process shown in FIG. 9.

FIG. 9 is a flowchart for mapping windows and calculating DC coefficients in the present invention. As shown in FIG. 9, in step 301, coordinates of a window defined by Wxi, Wyi, where i equals 1, . . . 4, in the image of the standard size are selected by the user in advance. Also in step 301, the new image size is provided as input. In step 302, each coordinate of the window in the standard image is mapped to correspond to the size of the new image. In step 303, weights are calculated based on the partial area of the macro block covered by the window as a part of the total area of the window in the new image for each coordinate of the window defined in step 301. Then, in step 304 and as discussed with reference to FIG. 8(B), the DC value is calculated as the weighted sum of the DC values of the macro blocks which are covered by the window.

FIG. 10 is a flowchart showing frame signature extraction in the signature archival process of the present invention. As shown in FIG. 10, in step 401, an index j indicating which window pair in a frame for which a signature is being extracted is initialized to the value "1". In step 402, the process shown in FIG. 10 begins for window pairs $W_j$ and $W_j'$, having DC coefficients of the image and motion vectors $M_{wj}$ and $M_{wj}'$. In step 403, an index i indicating which of the DC components is being calculated is initialized to the value of "1". In step 404, the ith DC coefficient from window, indicated by DCi, is calculated for each window $W_j$, and the ith DC coefficient, indicated by DCi', is calculated for each window $W_j'$, in accordance with FIG. 6. In step 405, the absolute value of the difference between DCi and DCi' is compared to an arbitrary threshold amount, selected by the user. If the foregoing difference is less than the threshold amount then the ith signature bit $S_i$ is set equal to 1, as shown in step 406. On the other hand, if the foregoing difference is greater than or equal to the arbitrary threshold value, then the ith signature bit $S_i$ is set equal to 0, as shown in step 407.

From each of steps 406 and 407, the ith signature bit is concatenated with the previously created bits of the signature to form an updated version of the signature S, as shown in step 408. In step 409, if i is less than 6 (which is equal to the number of blocks (4 luminance plus 1 of each of two chrominance) in the macro block in the present invention), then i is incremented by 1 in step 410, and DCi and DCi' are calculated for the new value of i.

On the other hand, if i is greater than or equal to 6 in step 409, then in step 411, the absolute value of the motion vector $M_{wj}$ is compared to 0 to determine whether the motion vector is zero or non-zero. If the absolute value of the motion vector $M_{wj}$ is not 0, then motion bit mj is set equal to 1, in step 412. On the other hand, if the absolute value of the motion vector $M_{wj}$ is equal to 0, then motion bit mj is set equal to 0, in step 413. Then, in step 414, a new value of signature S is further formed by concatenating the signature S with the value of the motion bit mj.

In step 415, the absolute value of the motion vector $M_{wj}'$ is compared to 0. If the absolute value of the motion vector $M_{wj}'$ is greater than 0, then in step 416, the motion bit mj' is set equal to one. However, if the absolute value of the motion vector $M_{wj}'$ is equal to 0, in step 417, the value of the motion bit mj' is set equal to 0. In step 418, the signature S and the value of motion vector mj' are concatenated to form a new value for the signature S.

In step 419, if the value of index j (the window index) is less than the number of window pairs in the frame of the video clip, then the value of j is incremented by one in step 421 and the signature extraction process of the steps 402 through 420 is repeated. However, if the value of index j is greater than or equal to the number of windows in the frame of the video clip, then the signature extraction from one frame of the video clip is complete.

Another aspect of the present invention is retrieval of video clips using the signatures of the video clips discussed herein above. Since each video clip is represented as a sequence of signatures, as previously described, these signatures are used for comparing the video clips by the conventional Hamming distance measure.

A goal in video retrieval is to identify a query video clip, extract the signature of the query video clip, then retrieve other video clips from either local or remote, or a combination thereof, databases which are similar to the query video clip and based upon the signatures of the video clips stored in the databases.

The first step in the retrieval process is to extract the signatures from the query video clip. The signatures are extracted from the query video clip as explained herein above. Then, the signature of the query video clip is compared to the signatures representing video clips stored in the database. Since the signatures are in binary format, the process is not computationally expensive since the matching is done by measuring the conventional Hamming distance between binary numbers. For example, the Hamming distance measure between 0101 and 1011 is 3 because the number of different bits between 0101 and 1011 is 3.

For each comparison made by the computer between a signature from a frame of a query video clip and a signature from a frame of a database video clip, the computer performs a bitwise "exclusive-OR" operation. The Hamming distance between two frames is calculated by the computer as a sum of bits set to "1" obtained in the result of the bitwise "exclusive-OR" operation.

The Hamming distance between the query video clip and a segment from the database video clip is calculated by the computer as the sum over the consecutive corresponding frame signatures between the query video clip and the database video clip. Segments of video clips from the entire database with a minimum distance, or a maximum similarity, to the query video clip are provided as a result.

For video clips encoded using the MPEG encoding standard, motion information is also used in the retrieval process. If the coding pattern involves only I frames, as in the case of video clips encoded using the Motion JPEG encoding standard, then the matching between the query signature and the database signatures is performed by the computer using DC signatures.

In the present invention, the similarity of frames of the video clips is examined, with the ordering of the frames in the sequence being preserved. For example, in the present invention, the signature of a first representative frame of a query video clip is compared to the signature of a first representative frame of a database video clip. Likewise, the signature of a second representative frame of the query video clip is compared to the signature of a representative frame of the database video clip, if there is correspondence between the second representative frame of the query video clip and the foregoing representative frame of the database video clip.

Correspondence between signatures of representative frames from the query video clip and the database video clip occurs if the database video clip representative frame from which the database video clip frame signature is extracted is at a same frame location (or within one frame thereof) in the database video clip as the query video clip representative frame from which the query video clip frame signatures is extracted, taking into account an offset number of frames between the frames in the query video clip and the database video clip.

The offsets are discussed herein with reference to FIGS. 11(A) through 11(D).

Subsequently, the frame signatures are shifted by one frame signature, with the first frame signature from the query video clip being compared with the second frame signature from the database video clip, etc.

The foregoing process of shifting the comparison of the frame signatures by one frame signature is repeated until the signature of the query video clip sequence is compared against all sequences of frame signatures in the database video clip signature. The similarity expected, in the present invention, between the query video clip and the video clips stored in the video clip database, is calculated by subtracting from 128 the total Hamming distance between corresponding frame signatures in the present invention. The highest similarity score, therefore, for each database video clip is stored.

An example of retrieval of the video clips in the present invention is discussed with reference to the following pseudo-code. In the following pseudo-code, the Hamming distance measure between the signature of a query video clip and the signature of a database video clip is calculated.

Assume that the signature sequence Q for the query clip is $\{q_1, \ldots, q_n\}$, and the signature sequence D for the database clip is $\{d_1, \ldots, d_m\}$. The following pseudo-code provides the Hamming distance scores, in a preferred embodiment of the present invention, between the query clip signature and the database clip signatures. The similarity scores are determined, as above, from the respective Hamming distance scores.

```
Given Q = {q_1, . . . , q_n}, Q <> empty set
for s = 1, . . . , NUMBER_OF_VIDEO_CLIPS_IN_DATABASE
   TempQ = Q
   D_s = {d_1, . . . , d_m}, m is the number of
         representative frames in D_s,
         D_s <> empty set
   minscore = length of frame signature + 1
   for j = 1, m-n
      sum_j = 0
      count_j = 0
      for i = 1, n
         K <--closest Frames (D, q_i)
            /* K can have at most three elements */
         sum_j = sum_j + Σ Hamming(Sig(q_i),Sig(d_k))
                        k ∈ K
         count_j = count_j + |K|
      endfor i
      score_j = sum_j / count_j
      if (score_j < minscore), then minscore = score_j
      TempQ = {q_p | q_p <- q_p +
      d_j + 1 - d_j, for p = 1,n}
   endfor j
   Scores <-- insert (minscore, s)
endfor s
```

With the retrieval method of the present invention, as shown in the pseudo-code above, the total Hamming distance between the signature of a query video clip and the signature of a database video clip is calculated for all database video clips stored in a given database. The signature of the query video clip is compared with signature of the database video clip. The signatures correspond to frames in each video clip, but the distance between the frames for which respective signatures were extracted in the query sequence and between the frames for which the respective signatures were extracted in each database sequence are not necessarily equal; the distance can be selected arbitrarily. For example, a frame signature may have been extracted for each of frames 1, 2, and 7 of the query video clip, but for each of frames 1, 5, 11, and 15 of the database video clip if each of the above-mentioned frames are representative of the video clip. On the other hand, each fifth (or second, or third, etc., for example) frame may be arbitrarily selected for signature extraction in the video clip.

Referring now to the above-mentioned pseudo-code, Q is a set containing "n" entries and which comprises the signature sequence extracted from the query video clip. $D_s$ is a set containing "m" entries and which comprises the signature sequence extracted from the database video clip "s". The "for" j loop explained below is repeated, therefore, for each database video clip "s" stored in the video clip signature sequence database.

At the start of comparison between the query video clip signature sequence and each database video clip signature sequence, to preserve query video clip signature sequence Q, TempQ is initialized to Q. TempQ is then manipulated during the comparison between the query video clip signature sequence and the database video clip signature sequence "s". Then, the variable minscore is initialized to the value of the length of the frame signature+1. In a preferred embodiment, the length of the frame signature is 128 (bits).

In the above-mentioned pseudo-code, an index j determining the number of iterations of comparison between the signature of the query video clip and the signature of the database video clip is initialized. The index j is based on the number of frame signatures in each of the foregoing video clips, as shown. Variables sum_j, which indicates the Hamming distance for the comparison of the signature of the query video clip to the signature of the database video clip for iteration j, and count_j, which is the number of comparisons between frame signatures for the foregoing video clips, are also initialized. An index i indicates the number of the representative frame signature in the query video clip signature sequence. An index k indicates the number of frames in the database video clip which are within no more than one frame of the representative frame in the query video clip, taking into account any shifting or offset of frames.

In the above-mentioned pseudo-code, each frame signature of the query video clip signature is compared to a corresponding frame signature of the database video clip signature. In addition, each frame signature of the query video clip signature is compared to the previous or next frame signature of the database video clip signature, if correspondence (as explained in detail above) exists. Accordingly, each representative frame (which is a frame for which a signature has been extracted) of the query video clip is compared to each representative frame of the database sequence video clip corresponding to or within one frame (which is a preferred embodiment of the present invention, but could be any pre-established number of frames) in either frame direction of the corresponding frame from the query video clip, taking into account the relative starting positions between the frames of the query sequence and the frames of the video clips.

For each of the one, two, or three (which value is indicated by "k") frames meeting the above-mentioned criteria from the query video clip frame (as explained herein above), the Hamming distance between the signature of the video clip and the signature of the database clip for the frames being compared is determined, and sum_j and count_j are updated accordingly.

In the foregoing pseudo-code, the Hamming distance is computed for each of the one, two, or three frames which are within one frame of the query video clip frame; however, in the present invention, any number of frames within a distance of the pre-established number of frames from the query video clip frame could be used for computing the Hamming distance measure between the query video clip signature and the database video clip signature.

After the comparison between the signature of the query video clip and the signature of the database video clip is complete for the current offset between the entries of the query video clip signature sequence and the database video clip signature sequence, the average (score_j) is calculated by dividing the sum of the Hamming distances between the signature of a query representative frame and the signatures of the representative, corresponding frames by the number of Hamming distances calculated.

Since minscore stores the value of the lowest Hamming distance measure between the signature sequence extracted from the query video clip and the signature sequence extracted from the database video clip, if the Hamming distance measure calculated for the current offset between the entries in the query video clip signature sequence and the database video clip signature sequence is lower than the Hamming distance measure calculated for the same database video clip signature sequence at any prior offset, the value of minscore is replaced by the value of score_j.

For the above-mentioned pseudo-code, since the number of frames in the database video clip is assumed larger than the number of frames in the query video clip, the comparison between the signature of the query video clip and the database video clip is repeated a number of times equal to a number of sequences of frame signatures in the database video clip in which the sequence of frame signatures in the query video clip may exist, preserving the sequence of frame signatures within each video clip (i.e., keeping the video clip frame signatures in the same order). Index j determines when the foregoing criteria has been met.

For each subsequent comparison between the query video clip signature and the database video clip signature, the query video clip signature is offset against the database video clip signature by one representative frame. In the above-mentioned pseudo-code, $$\text{Temp}Q = \{q\_p | q_{13}p <- q\_p + d\_j + 1 - d\_j, \text{ for } p=1,n\}$$

offsets the entries in the query video clip sequence so that the signature extracted from the first representative frame in the query video clip is offset to correspond to the next entry in the database video clip signature sequence. The next entry in the database video clip signature sequence is the entry in the database video clip signature sequence immediately subsequent to the entry in the database video clip signature sequence to which the signature extracted from the first representative frame in the query video clip signature sequence corresponded in the previous iteration of the "for" j loop.

At the completion of the "for" j loop for the current database video clip signature sequence "s" in the database, the value of minscore and the corresponding, current value of "s" are inserted into an array Scores. Scores stores the lowest value of the Hamming distance measure for each database video clip against which the query video clip signature sequence was compared in accordance with the present invention.

The array Scores is, in a preferred embodiment, a linked list, which is sorted based on the lower scores. The lowest score stored in Scores indicates the best "match", or closest similarity, between the query video clip signature sequence and the database video clip signature sequence stored in the database.

If similarity between the signature of the query video clip and the signature of each, respective database video clip is used as the basis for sorting database video clips, then the database video clips are arranged in descending order of similarity.

With the above-mentioned pseudo-code of the present invention, the search can be started with any signature in the database.

As shown in the above-mentioned pseudo-code, in a preferred embodiment of the present invention, when calculating the measure of the distance between the signatures of two video clips, the average of all scores of frame signatures compared is used. However, there are cases when the similarity measure can be based upon other criteria, such as local resemblance between two video clips. The following are methods at the frame level for determining video similarity measures in the present invention:

1. Using the average overall scores of matched frames (which is shown in the above-mentioned pseudo-code);
2. Using the average over part of the highest score of matched frames; or
3. Using the average over the local scores in the proximity of a few local maximae, in which the averages of the similarity between signatures of representative frames providing the highest similarity are used.

The present invention is not limited to the above-mentioned methods. In addition, further methods at levels other than the frame level may also be employed.

The above-mentioned similarity measures provide the overall similarity between two video clips, taking into account the linear appearance of spatial and motion features of the respective video clips. The foregoing methods are useful when the similarity between two video clips should be relative to the linear placement of the scenes in the respective video clips. However, when the overall similarity of subsegments of two video clips is needed, regardless of the placement of the scenes in the video (for example, the beginning frames of the query video clip can be matched with the ending frames of the database video clip and vice-versa), the average of the highest scores of the similar common subsegments must be used.

Further, in the present invention, users are able to attach importance to various parts of the video query clip, to various aspects of video representation such as spatial and motion aspects. The user is able to:

1. Attach importance to a subsequence (which is a part of the sequence) of frames;
2. Attach importance to features such as luminance, chrominance, and motion components of video clips;
3. Select the density of representative frames in the sequence of the representative frames to be used in the searching process; and
4. Select video frames which are important in the searching process.

An example of a comparison between signature of the query video clip and the signature of a database video clip consistent with the above-mentioned pseudo-code is shown in FIGS. 11(A) through 11(D). In FIGS. 11(A) through 11(D), the value of m=13 and n=4; therefore, m−n=4 iterations of comparisons between the above-mentioned signature sequences are made.

In the retrieval process, the signatures of frames from the query video clip are compared to the signatures of frames from each database video clip. FIGS. 11(A) through 11(D) indicate by "R" which frame numbers from each of the query video clip and the database video clip are compared. Frames being compared in accordance with the aforementioned pseudo-code and criteria are indicated by arrows.

As shown in FIG. 11(A), representative frames, which are frames for which signatures have been extracted in accordance with the above-mentioned aspect of the present invention, are designated by "R" for each of the query video clip and the database video clip. The representative frames can be placed at any frame position, either randomly or at regular intervals, or at each frame. Even if the representative frames are placed in an irregular pattern, the method of the present invention is fully capable of retrieving database video clips in accordance with the foregoing explanations.

Also as shown in FIG. 11(A), frame 1 of the query video clip is compared with frame 1 of the database video clip. Then, since the next frame of the database video clip having a signature is frame 4, the distance between frame 1 of the query video clip and frame 4 of the database video clip is too large (i.e., exceeds the distances of one frame arbitrarily selected and explained below). Therefore, frame 1 of the query video clip is compared solely with frame 1 of the database video clip.

The distance for correspondence between the frame number of the representative frame of the query video clip and the frame number of the representative database frame from the database video clip is selected arbitrarily; in the case of FIGS. 11(A) through 11(D) example, that parameter is chosen arbitrarily as one. Therefore, if a representative frame in the query video clip is frame number 6, then the signature extracted from frame number 6 of the query video clip is compared only with signatures which exist for frame numbers 5, 6, or 7 from the database video clip. Accordingly, in the example of FIG. 11(A), even though a signature for frame number 4 of the database video clip exists, there is no frame from the query video clip which is eligible to be compared with the signature of frame number 4 from the database video clip (based on the arbitrarily chosen parameter of a distance of one frame between the query video clip frame and the database video clip frame).

Likewise, and also as shown in FIG. 11. (A), frame 6 of the query video clip is a representative frame the signature for which is compared with the signature for frame 7 from the database video clip, also a representative frame within one frame of frame 6 of the query video clip. Even though, as shown in FIG. 11 (A), frame 8 of the query video clip is a representative frame, and frame 7 of the database video clip, also a representative frame, and is within one frame of frame 8 from the query video clip, frame 8 from the query video clip is not compared with frame 7 of the database video clip since frame 7 of the database video clip has already been compared with frame 6 from the query video clip.

In the present invention, once signature from a representative frame from the database video clip has been compared with a signature from a representative frame from the query video clip, that signature of the representative frame from the database video clip is not compared with a signature from another representative frame from the query video clip until the entries in the query video clip signature sequence are offset against the entries in the database video clip signature sequence. However, in another embodiment of the present invention, the foregoing restriction of not using a signature from a representative frame from the database video clip for a second comparison is removed.

FIG. 11(A) also shows that the frame signatures from query video clip frames 11, 13, 15, and 17 are compared with frame signatures from representative database video clip frames in accordance with the above-mentioned description. Respective signatures from representative frames 20 and 24 from the query video clip are each compared with respective frame signatures from two frames from the database video clip; each of the foregoing two database video clip representative frames falls within one frame of the corresponding representative query video clip frame. Therefore, two "scores" for each of representative frames 20 and 24 from the query video clip are obtained. In that case, the two respective "scores" are averaged for each of representative video clip frame 20 and representative query video clip 24, as indicated in the above-mentioned pseudo-code.

In FIG. 11(B), the same query video clip as shown in FIG. 11(A), is off-shifted to the second representative frame signature from the database video clip, in accordance with the pseudo-code described herein above.

As shown in FIG. 11(B), the signature extracted from representative frame 1 from the query video clip is compared with the signature extracted from representative frame 4 from the database video clip. Then, since a second representative frame from the database video clip is not within one frame of the representative frame from the query video clip, taking into account the off-set positions of the two respective video clips, frame 1 from the query video clip is not compared with any other frames from the database video clip. Likewise, representative frame 6 from the query video clip does not correspond to a representative frame from the database video clip, nor is within one frame of the database video clip taking into account the foregoing offset position. Therefore, the signature extracted from representative frame 6 from the query video clip is not compared with the signatures extracted from any frames from the database video clip.

In FIG. 11(B), the signature extracted from representative frame 8 from the query video clip is compared with the signature extracted from representative frame 11 from the database video clip. Representative frame 8 from the query video clip corresponds to representative frame 11 from the database video clip, taking into account the offset between the query video clip frames and the database video clips frames. Likewise, the signature extracted from representative frame 11 from the query video clip is compared with the signature extracted from representative frame 14 from the database video clip. The respective signatures extracted from representative frames 13, 15, 17, 20, and 24 from the query video clip are compared with respective signatures extracted from corresponding representative frames from the database video clip, in accordance with the foregoing explanations.

In the case of FIG. 11(C), the signature extracted from representative frame 1 from the query video clip is compared with the signature extracted from representative frame 7 from the database video clip, representative frame 7 being the next representative frame to which representative frame 1 from the query video clip is offset. Likewise, the signature extracted from representative frame 6 from the query video clip is compared with the signature extracted from representative frame 11 from the database video clip, etc.

In the case of FIG. 11(D), the signature extracted from representative frame 1 from the query video clip is compared with the signature extracted from representative frame 11 from the database video clip, representative frame 11 being the next representative frame to which representative frame 1 from the query video clip is offset. Likewise, the signature extracted from representative frame 6 from the query video clip is compared with the respective signatures extracted from representative frames 15 and 17 from the database video clip, etc.

In the foregoing examples shown in FIGS. 11(A) through 11(D), the difference in the number of frames between the first representative frame from the query video clip and the representative frame from the database video clip to which the representative frame from the query video clip is compared is preserved for each frame signature comparison between the query video clip and the database video clip.

FIG. 12 shows an example of an implementation of a user interface 32 described herein above with reference to FIG. 3. The user interface 46 shown in FIG. 12 is implemented using a TCL/TK toolkit running on an X WINDOWS™ platform. When a user selects "Search by Video" 48, a topic such as "NEWS" 50, and a query video clip 52 (which is shown as the upper leftmost icon in the workspace for retrieval area 54), then the present invention searches extracted signatures from a meta database 22 (described herein above with reference to FIG. 3) and displays results of that search in the workspace for retrieval area 54. The resultant video clips are ordered according to similarity level to the query video clip, from left to right across rows, then from top to bottom of columns. Screen window 56 displays a thumbnail (or reduced image) of a selected video.

The present invention is not limited to the embodiments, described above, but also encompasses variations thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method comprising the steps of:

partitioning an at least one frame of a video clip into a plurality of window pairs, each of the plurality of window pairs including a first window and a second window, creating at least one signature corresponding to the at least one frame based on a plurality of differences between each first window and each second window of the plurality of window pairs; and storing the at least one signature in a database.

2. A method for identifying video clips similar to a query video clip, said method comprising:

creating a signature of each of the video clips and the query video clip by partitioning an at least one frame of each of the video clips and the query video clip into a plurality of window pairs, each of the plurality of window pairs including a first window and a second window, and creating the signature corresponding to the at least one frame of each of the video clips and the query video clip based on a plurality of differences between each first window and each second window of the plurality of window pairs;

determining a score of the similarity of the signature of each of the video clips to the signature of the query video clip; and ordering the video clips based on the score.

3. The method according to claim 2, wherein the score is determined by calculating the Hamming distance measure between the signatures.

4. The method according to claim 2, further comprising displaying the video clips based on the score.

5. The method according to claim 2, further comprising the steps digitally encoding the video clips into the MPEG format, if the video clips are not encoded in the MPEG format.

6. A method comprising the steps of:
creating a signature of a query video clip by partitioning an at least one frame of the query video clip into a plurality of window pairs, each of the plurality of window pairs including a first window and a second window, and creating the signature corresponding to the at least one frame of the query video clip based on a plurality of differences between each first window and each second window of the plurality of window pairs;
comparing the signature of the query video clip to signatures of a plurality of video clips in a database; and
retrieving at least one of the plurality of video clips responsive to the comparison.

7. The method according to claim 6, wherein the database stores the location, size, and time length of the at least one of the plurality of video clips corresponding to the signatures.

8. An apparatus comprising:
a source that supplies a plurality of video clips; and
an information retrieval system that:
extracts signatures from the plurality of video clips and from a query video clip based on a difference between a first window and a second window of a plurality of window pairs of an at least one frame from each of the plurality of video clips and from the query video clip,
identifies at least one of the plurality of video clips similar to the query video clip by comparing the signature of the query video clip to the signatures of the plurality of video clips, and
retrieves from the video source the at least one of the plurality of video clips similar to the query video clip.

9. An apparatus comprising:
an archival and signature extraction section that extracts a plurality of signatures from a plurality of video clips based on a difference between a first window and a second window of a plurality of window pairs of an at least one frame from each of the plurality of video clips; and
a database that stores the signatures.

10. An apparatus comprising:
a source that supplies video clips and video clip signatures that are based on a difference between a first window and a second window of a plurality of window pairs of an at least one frame of the video clips; and
an information retrieval system that:
extracts a query signature from a query video clip,
compares the query signature to the video clip signatures, and
retrieves from the video source a video clip responsive to the comparison.

11. The apparatus according to claim 10, wherein the information retrieval system further comprises a retrieval subsystem that determines a similarity between the query signature and the video clip signatures.

12. The apparatus according to claim 10, further comprising a database that stores the video clip signatures.

13. The apparatus according to claim 12, wherein the database stores the location, size, and time length of the video clips corresponding to each of the video clip signatures.

14. A computer for retrieving and displaying a plurality of video clips from video sources comprising:
a source supplying the video clips;
an information retrieval system that:
extracts signatures from the plurality of video clips and from a query video clip based on a difference between a first window and a second window of a plurality of window pairs of an at least one frame from each of the plurality of video clips and from the query video clip,
identifies at least one of the plurality of video clips similar to the query video clip by comparing the signature of the query video clip to the signatures of the plurality of video clips, and
retrieves from the source the at least one of the plurality of video clips similar to the query video clip; and
a display for displaying the video clips similar to the query video clip.

15. An apparatus for retrieving and displaying a plurality of video clips from video sources, said apparatus comprising:
a source supplying the video clips;
an information retrieval system comprising:
an archival and signature extraction section for encoding each of the video clips and a query video clip into an MPEG format if the query video clip and the video clips are not in the MPEG format, and extracting signatures of query video clip and the video clips, wherein the signatures of the video clips are based on a difference between DC components of windows of a frame within the video clips, and the signature of the query video clip is based on a difference between DC components of windows of a frame within the query video clip,
a database for storing the signatures of the video clip, and
a retrieval subsystem identifying the video clips similar to the query video clip by comparing the signature of the query video clip to the signatures of the video clips; and
a display for displaying the video clips similar to the query video clip.

16. The apparatus according to claim 14, further comprising a database which stores the location, size, and time length of the video clips corresponding to each of the signatures of the video clips.

17. The method according to claim 7, wherein similarity between the signatures of the video clips and the signature of the query video clip is determined by Hamming distance measure.

18. The method according to claim 17, wherein the Hamming distance measure is determined between each signature frame of the query video clip and three or fewer signature frames of one of the database video clips.

19. The method according to claim 2, further comprising the step of digitally encoding the video clips into the Motion JPEG format, if the video clips are not encoded in the Motion JPEG format.

20. An apparatus comprising:
a video source providing video clips, said video source comprising:
an MPEG video server providing the video clips encoded using an MPEG encoding standard,
a live video source providing the video clips, and
a network source providing the video clips encoded using an encoding standard other than the MPEG encoding standard;

a video information retrieval system, coupled to the video source, extracting signatures from the video clips and comparing a signature extracted from a query video clip to the signatures, said video information retrieval system comprising:
an archival and signature extractor that:
at least partially re-encodes, using the MPEG encoding standard, the video clips, if the video clips are not encoded using the MPEG encoding standard, and
extracts the signatures from the video clips if the video clips are encoded or re-encoded using the MPEG encoding standard, wherein the signatures from the video clips are based on a difference between DC components of the MPEG encodings of windows of a frame within the video clips, and the signature from the query video clip is based on a difference between DC components of the MPEG encodings of windows of a frame within the query video clip, a database, coupled to the archival and signature extractor, that stores the signatures, along with identifying data of the respective video clips corresponding to the signatures, and a retrieval subsystem, coupled to the database, that compares the signature of a query video clip with the signatures stored in the database, and determines a similarity between the signature of the query video clip and each of the signatures stored in the database, said retrieval subsystem comprising:
a similarity calculator for calculating the similarity;
an ordering unit, coupled to the similarity calculator, for ordering the signatures based on the similarity, and
a fetch and display unit, coupled to the ordering unit, for retrieving video clips corresponding to the signatures; and
a user interface, coupled to the video retrieval subsystem, for displaying the video clips.

21. An information retrieval system comprising:

means for connection to a source that supplies a plurality of video clips, means for extracting signatures from the plurality of video clips and from a query video clip based on a difference between a first window and a second window of a plurality of window pairs of an at least one frame from each of the plurality of video clips and from the query video clip, means for identifying at least one of the plurality of video clips similar to the query video clip by comparing the signature of the query video clip to the signatures of the plurality of video clips, and means for retrieving from the video source the at least one of the plurality of video clips similar to the query video clip.

* * * * *